(12) United States Patent
Harada et al.

(10) Patent No.: US 7,473,721 B2
(45) Date of Patent: Jan. 6, 2009

(54) NANOCOMPOSITE MATERIAL FOR THE PRODUCTION OF INDEX OF REFRACTION GRADIENT FILMS

(75) Inventors: Takamasa Harada, Kikari Inzai-machi (JP); Fumio Kita, Wiesbaden (DE); Andreas Zimmermann, Griesheim (DE); Ulrike Dellwo, Gusenburg (DE); Martin Mennig, Quierschied (DE); Peter W. Oliveira, Saarbruecken (DE); Helmut Schmidt, Saarbruecken-Guedingen (DE); Heike Schneider, Saarbruecken (DE)

(73) Assignee: Tomoegawa Co., Ltd., Tokyo (JP)

( * ) Notice: Subject to any disclaimer, the term of this patent is extended or adjusted under 35 U.S.C. 154(b) by 459 days.

(21) Appl. No.: 10/500,194

(22) PCT Filed: Jan. 3, 2003

(86) PCT No.: PCT/EP03/00020

§ 371 (c)(1),
(2), (4) Date: Jun. 24, 2004

(87) PCT Pub. No.: WO03/057773

PCT Pub. Date: Jul. 17, 2003

(65) Prior Publication Data

US 2005/0101698 A1 May 12, 2005

(30) Foreign Application Priority Data

Jan. 10, 2002 (DE) .............................. 102 00 760

(51) Int. Cl.
*C08K 9/12* (2006.01)
(52) U.S. Cl. ................ 523/210; 524/430; 524/431; 524/442; 524/493
(58) Field of Classification Search ............... 523/210; 524/430, 431, 442, 493
See application file for complete search history.

(56) References Cited

U.S. PATENT DOCUMENTS

| 3,787,378 | A | * | 1/1974 | Blank ...................... 525/330.2 |
| 5,134,021 | A | | 7/1992 | Hosono et al. |
| 5,529,473 | A | | 6/1996 | Lawton et al. |
| 5,552,261 | A | | 9/1996 | Kraska et al. |
| 6,236,493 | B1 | * | 5/2001 | Schmidt et al. ............. 359/296 |
| 6,268,961 | B1 | | 7/2001 | Novitt et al. |
| 6,291,070 | B1 | | 9/2001 | Arpac et al. |
| 7,108,810 | B2 | * | 9/2006 | Nakamura et al. ........... 264/1.7 |
| 2004/0246584 | A1 | | 12/2004 | Ahn |
| 2006/0057398 | A1 | * | 3/2006 | Zimmermann et al. ....... 428/426 |

FOREIGN PATENT DOCUMENTS

| DE | 195 11 627 A1 | 3/1995 |
| DE | 197 19 948 | 10/1995 |
| DE | 197 19 948 A1 | 5/1997 |
| EP | 0 437 902 | 7/1991 |
| EP | WO 95/13326 | 10/1994 |
| EP | WO 97/38333 | 4/1997 |
| EP | 0 671 638 | 11/1998 |
| JP | 09-222504 | 8/1997 |
| JP | 2000-302960 | * 10/2000 |
| WO | WO 94/29768 | 12/1994 |
| WO | WO 97/38333 | 10/1997 |
| WO | WO 01/22130 | 3/2001 |
| WO | WO 03/005072 | 1/2003 |

OTHER PUBLICATIONS

English Language Translation of JP 09-222504.
International Preliminary Examination Report (Form PCT/IPEA/409) along with English Language Translation of International Preliminary Examination Report (Form PCT/IB/409) for PCT/EP03/00020.

(Continued)

*Primary Examiner*—Bernard Lipman
(74) *Attorney, Agent, or Firm*—Sterne, Kessler, Goldstein & Fox P.L.L.C.

(57) ABSTRACT

The invention relates to solid or gel-type nanocomposite material which can be polymerised, containing a) 4.9 95.9 wt. % of a soluble polymer; b) 4-95 wt. % of a partially or totally condensed silane selected from the group of epoxyalkoxysilanes, alkoxysilanes and alkylalkoxysilanes, the silane having an inorganic condensation degree of between 33-100% and an organic conversion degree of between 0-95%; c) 0-60 wt. % of an acrylate; d) 0.1-50 wt. % of surface modified nanometric particles selected from the group of oxides, sulphides, selenides, tellurides, halogenides, carbides, arsenides, antimonides, nitrides, phosphides, carbonates, carboxylates, phosphates, sulphates, silicates, titanates, zirconates, aluminates, stannates, plumbates and a mixed oxides; e) 0-50 wt.-% of a plasticizer; f) 0-5 wt. % of a thermal or photochemical cross-linking initiator, sensitizer, auxiliary wetting agent, adhesive agent, antioxidant, stabiliser, coloring agent, photochrome material and thermochrome material in relation to the total weight (dry weight) of the nanocomposite material.

10 Claims, No Drawings

OTHER PUBLICATIONS

International Search Report (PCT/IPEA/210) and along with English Language Translation of International Search Report (Form PCT/IPEA/210) for PCT/EP03/00020.

Notifice of International Preliminary Examination Report (PCT/IPEA/416) and International Preliminary Examination Report (Form PCT/IPEA/409) along with English Language Notification of Transmittal of Copies of Transition of the International Preliminary Examination Report (Form PCT/IB/338 ) and English Language Translation of International Preliminary Examination Report (Form PCT/IPEA/409) for PCT/EP02/13846.

International Search Report (PCT/IPEA/210) and along with English Language Translation of International Search Report (Form PCT/IPEA/210) for PCT/EP02/13846.

Notifice of International Preliminary Examination Report (PCT/IPEA/416) and International Preliminary Examination Report (Form PCT/IPEA/409) for PCT/EP03/02676.

International Search Report (PCT/IPEA/210) along with English Language Translation of International Search Report (Form PCT/IPEA/210) for PCT/EP03/02676.

* cited by examiner

NANOCOMPOSITE MATERIAL FOR THE PRODUCTION OF INDEX OF REFRACTION GRADIENT FILMS

The present invention relates to a nanocomposite material for the production of a material with a refractive index gradient, having a material gradient which is caused by nanoscale particles, and to the use of such a material with a refractive index gradient for the production of films with a refractive index gradient, in particular for holographic and mask illumination applications, as well as for graded index lenses in imaging optics.

It is known that the diffusion of monomers with a higher or lower refractive index than the surrounding liquid matrix can be used for the production of a refractive index gradient (U.S. Pat. Nos. 5,552,261, 5,529,473). The "Colburn-Haines effect" known in photopolymers for directed diffusion with subsequent polymerization in the heated or illuminated areas leads to an increase in density and therefore to an increase or decrease in refractive index. In organic monomers, however, this change is small since the resultant density change makes only a small contribution to the molar refraction. The refractive index gradient profile is then fixed by subsequent crosslinking, for example by means of photopolymerization. Disadvantages with these materials are relatively small refractive index modification amplitudes, long process times and high scattering losses.

It is known from WO 97/38333 that refractive index gradients can also be produced by means of the migration of nanoparticles with a higher or lower refractive index in a liquid (sol) photopolymerizable matrix, and can be fixed by means of subsequent crosslinking (polymerization, condensation). The essential disadvantage of this method is that it is restricted to a liquid matrix phase, which entails handling problems when applying holography and mask illumination techniques.

It was therefore an object of the present invention to develop a material which is capable of forming a sufficiently large refractive index gradient by application of an electrical potential difference, electron irradiation, holography, lithography or by illumination, and which overcomes the aforementioned disadvantages.

It has been found that this object can surprisingly be achieved by a matrix in solid or gel form as defined below.

The invention relates to a polymerizable nanocomposite material, containing a) from 4.9 to 95.9% by weight, preferably from 10 to 80% by weight, in particular from 20 to 40% by weight, of a soluble polymer;

b) from 4 to 95% by weight, preferably from 10 to 80% by weight, in particular from 20 to 60% by weight, of at least one partially or fully condensed silane from the following group: acrylosilanes, epoxysilanes, acryloalkoxysilanes, acryloepoxysilanes, epoxyalkoxysilanes, alkoxysilanes and alkylalkoxysilanes, the silane having an inorganic condensation ratio of from 33 to 100% and an organic conversion ratio of from 0 to 95%, preferably from 5 to 60%;

c) from 0 to 60% by weight, preferably from 0.1 to 40% by weight, for example from 0.1 to 4.9% by weight, in particular from 0.5 to 4% by weight, of an acrylate;

d) from 0.1 to 50% by weight, preferably from 1 to 40% by weight, in particular from 5 to 30% by weight, of surface-modified nanoscale particles from the following group: oxides, halides, silicates, titanates, zirconates, aluminates, stannates, plumbates and mixed oxides thereof;

e) from 0 to 50% by weight, preferably from 0.1 to 30% by weight, in particular from 1 to 20% by weight, of a softener;

f) from 0 to 5% by weight, preferably from 0.01 to 1% by weight, of a thermal or photochemical crosslinking initiator, sensitizer, wetting agent, adhesion promoter, antioxidant, rheological additive, stabilizer, colorant, photochromic and thermochromic substance, or a combination thereof, in each case expressed in terms of the total weight (dry weight) of the nanocomposite material.

The dynamic viscosity of the nanocomposite material according to the invention is (at 25° C.) from 2 to 1000 Pas, preferably from 5 to 500 Pas, in particular from 10 to 100 Pas, measured by a rotation viscosimeter.

The soluble polymer a) is preferably a polyacrylate, polymethacrylate, polyepoxide, polyvinyl alcohol, polyvinyl acetate or polyvinyl butyral which is soluble in an organic solvent. Preferable organic solvents are alcohols such as ethanol, isopropanol or butanol, ketones such as acetone, esters such as ethyl acetate, ethers such as tetrahydrofuran and aliphatic, aromatic and halogenated hydrocarbons such as hexane, benzene, toluene and chloroform.

Suitable silanes b) are those with one, two, three or four, preferably two or three, hydrolyzable groups and mixtures thereof. Examples of hydrolyzable groups are hydrogen or halogen, such as F, Cl, Br or I; alkoxy, preferably $C_{1-6}$ alkoxy, such as e.g. methoxy, ethoxy, n-propoxy, I-propoxy and butoxy; aryloxy, preferably $C_{6-10}$ aryloxy, such as e.g. phenoxy; acyloxy, such as e.g. acetoxy or propionyloxy; alkylcarbonyl, preferably $C_{2-7}$ alkylcarbonyl, such as e.g. acetyl; amino, monoalkylamino or dialkylamino with preferably from 1 to 12, in particular from 1 to 6, carbon atoms in the alkyl group(s).

Particularly preferred silanes are e.g. methacryloxypropyltrimethoxysilane, acryloxypropyltrimethoxysilane, dimethyldimethoxysilane, dimethyldiethoxysilane, 3-glycidyloxypropyltrimethoxysilane, glycidyloxy-propyltriethoxysilane, vinyltriethoxysilane, methyltriethoxysilane.

The partial condensation of the silanes may be carried out with a substoichiometric amount, e.g. from 0.3 to 0.9 times the stoichiometric amount, of the hydrolyzer, such as e.g. water, aqueous HCl, aqueous $HNO_3$ or aqueous ammonia. The amount of hydrolyzer may in this case be proportioned in such a way that an inorganic condensation ratio of from 33 to 100% is obtained. An inorganic condensation ratio of 33% means, for example, that on average one out of three hydrolyzable residues of the silane is condensed to form an —Si—O—Si— bridge. With a condensation ratio of 100%, all the hydrolyzable residues of the silane molecule in question are condensed.

The organic conversion ratio indicates the extent of the addition polymerization reaction of the C=C double bonds or epoxy groups present in the side chains. An organic conversion of 95% means, for example, that 95% of all the C=C double bonds or epoxy groups have reacted. In the case of C=C double bonds, e.g. in acrylate residues, the organic conversion ratio can be measured through the decrease of the C=C vibration bands in the IR spectrum. The addition polymerization can be induced by normal methods, such as acid or base hydrolysis in the case of epoxy groups, or UV irradiation in the case of C=C double bonds.

The acrylate c) is preferably methyl methacrylate or a diol diacrylate or diol dimethacrylate, such as e.g. hexanediol dimethacrylate, hexanediol diacrylate, dodecanediol diacrylate or dodecanediol dimethacrylate.

The surface-modified nanoscale particles d) preferably comprise the oxides ZnO, CdO, $SiO_2$, $TiO_2$, $ZrO_2$, $CeO_2$, $SnO_2$, $Al_2O_3$, $In_2O_3$, $La_2O_3$, $Fe_2O_3$, $Ta_2O_5$, $Cu_2O$, $V_2O_5$, $MoO_3$ and $WO_3$ as well as the halides AgCl, AgBr, AgI, CuI, CuBr, $CdI_2$ and $PbI_2$. The surface groups may be organic polymerizable and/or condensation polymerizable groups which are susceptible to radical, cationic or anionic, thermal or photochemical polymerization, or thermal or photochemical condensation polymerization. According to the invention, surface groups which have a (meth)acryl, allyl, vinyl or epoxy group are preferred, (meth)acryl and epoxy groups being particularly preferred. The main relevant condensation polymerizable groups are hydroxyl, carboxyl and amino groups, with the aid of which it is possible to obtain ether, ester and amide bonds between the nanoscale particles and with the silane.

The organic groups which are present on the surfaces of the nanoscale particles, and which comprise the polymerizable and/or condensation polymerizable groups, preferably have a molecular weight of less than 300, in particular less than 200.

All the customary production methods, as described e.g. in DE-A-197 19 948, may be suitable for production of the surface-modified nanoparticles.

The nanoparticles preferably have a diameter of not more than 100 nm, in particular not more than 50 nm. There is no particular restriction concerning the lower limit, although for practical reasons this lower limit is generally 0.5 nm, in particular 1 nm and often 4 nm.

As the softener e), all the compounds which have elasticizing or softening properties according to DIN 55945 (December 1988) are in principle suitable, and primarily those of the ester type. Plasticisers from the following group are preferred: acyclic aliphatic dicarboxylic acid esters, e.g. esters of adipic acid such as di-n-octyl adipate, bis-(2-ethylhexyl) adipate, diisodecyl adipate, dibutyl sebacate, dioctyl sebacate and bis-(2-ethylhexyl) sebacate; esters of $C_6$-$C_{12}$ dicarboxylic acids with polyalkylene glycols, e.g. triethylene glycol bis-(n-heptanoate), triethylene glycol bis-(2-ethylhexanoate), triethylene glycol bis-(isononanoate); esters of $C_6$-$C_{12}$ dicarboxylic acids with polyalkylene glycols, e.g. triethylene glycol bis-(2-ethyl-butyrate); diesters of (meth) acrylic acid and polyalkylene glycols, such as polypropylene glycol diacrylate or dimethacrylate, polyethylene glycol diacrylate or dimethacrylate, for example tetraethylene glycol di(meth)acrylate.

The nanocomposite material expediently contains a polymerization, addition polymerization and/or condensation polymerization catalyst f), which can thermally and/or photochemically induce the crosslinking and curing (collectively referred to as a "crosslinking initiator").

The starters available on the market may, for example, be used as photoinitiators. Examples of these are Irgacure® 184 (1-hydroxycyclohexyl phenyl ketone), Irgacure® 500 (1-hydroxycyclohexyl phenyl ketone, benzophenone) and other photoinitiators of the Irgacure® type; Darocur® 1173, 1116, 1398, 1174 and 1020, 2-chlorothioxanthone, 2-methylthioxanthone, 2-isopropylthioxanthone, benzoin, 4,4'-dimethoxybenzoin, benzoin ethyl ether, benzoin isopropyl ether, benzyl dimethyl ketal, 1,1,1-trichloroacetophenone, diethoxyacetophenone and dibenzosuberone.

Suitable thermal initiators are preferably organic peroxides in the form of diacyl peroxides, peroxy dicarbonates, alkyl peresters, dialkyl peroxides, perketals, ketone peroxides and alkyl hydroperoxides. Examples of such thermal initiators are dibenzoyl peroxide, tert.-butyl perbenzoate and azobisisobutyronitrile. An example of a cationic thermostarter is 1-methylimidazole.

Examples of rheological additives are polyether-modified dimethyl polysiloxanes, such as e.g. ®Byk 306. Examples of sensitizers are amine-modified oligoether acrylates, such as e.g. ®Crodamers.

The present invention also relates to a process for the production of the described nanocomposite material, wherein the silane b) is partially or fully condensed by adding a hydrolyzer and optionally polymerized by UV irradiation, and mixed with one or more of the components a), c) to f), or the silane b) is first mixed with one or more of the components a), c) to f) and then condensed and optionally polymerized, and optionally organic solvent is subsequently removed. The condensation with the hydrolyzer is preferably carried out at temperatures of between 5 and 40° C.

The nanoparticles which are required for the change in refractive index can be introduced into the system in various ways:

On the one hand, commercially available nanoparticles may be used as a suspension in solvents (compatible with the solvent of the polymer). The nanoparticle surface is firstly modified by reaction with compounds containing polymerizable groups, e.g. with unsaturated carboxylic acids, in particular methacrylic acid, acrylic acid, and acrylosilanes and/ or unsaturated β diketones. This suspension is then mixed with the silane polymer solution.

On the other hand, the nanoparticles may also be produced in situ by hydrolysis and condensation of corresponding precursors (preferably alkoxides) in the partly and pre-condensed organosilane component of the matrix, or in the mixture of pre-condensed organosilane and dissolved polymer.

The invention furthermore relates to the use of the described nanocomposite material for the production of a planar material, in particular films, with a refractive index gradient.

In order to produce a material with a refractive index gradient, the photopolymerizable nanocomposite material according to the invention is applied to a suitable substrate, such as e.g. glass, ceramic, silicon, metal, semiconductor materials or (preferably transparent) plastic films, in particular PET, PE, PP.

The coating of the photopolymerizable nanocomposite material may be carried out according to normal methods, e.g. dip coating, flow coating, with a doctor blade, casting, spin coating, injection, spreading, slot coating, meniscus coating, film casting, spinning or spraying. The viscosity required in each case may be adjusted by addition or removal of the solvent being used. Preferred layer thicknesses (in the cured state) are from 0.2 to 100 μm.

The invention furthermore relates to a film with a refractive index gradient, consisting essentially of one or two transparent plastic films which are coated with a nanocomposite material according to the invention, in which a refractive index gradient has been produced by applying an electrical potential difference, electron irradiation, holography, lithography or by local illumination.

The invention furthermore relates to a process for the production of a film with a refractive index gradient, wherein a nanocomposite material according to the invention is applied to a transparent plastic film, organic solvent is allowed to evaporate if appropriate, expediently to a residual content of from 0 to 15% by weight, in particular from 2 to 12% by weight, expressed in terms of the total weight of the film with a refractive index gradient, and optionally the nanocomposite layer is laminated with a transparent cover film for protection. In this form, the film material may be rolled up and temporarily stored, while being protected from light and in a controlled environment (15-30° C.). By applying an electrical potential difference, electron irradiation, holography, lithography or by local illumination, a refractive index gradient is produced in the nanocomposite layer and is fixed by complete thermal and/or light-induced crosslinking of the nanocomposite material.

Irradiation with UV Light is Preferred

The relatively intense local illumination leads to crosslinking of the nanoparticles with the partially condensed silane component of the gelled matrix among one another and/or with one another, so that a chemical potential gradient with respect to the unilluminated neighboring region is formed for nanoparticles with C=C on their surface. Further nanoparticles diffuse from this neighboring region into the illuminated region. This process can take place during and after the illumination, and it generally lasts from a few seconds to a few minutes, depending on the illumination conditions and the temperature. Owing to the difference in refractive index between the nanoparticles and the matrix, a local refractive index gradient is formed in this way. This process is followed by complete crosslinking of the matrix by photopolymerization and/or thermally induced polymerization. (The expression "polymerization", as used herein, is intended to include not only polymerization in the strict sense, but also addition polymerization reactions and condensation polymerization reactions). In this case, residual solvent is removed if appropriate.

Surprisingly, particle migration takes place in the matrix according to the invention even though it is in solid or gel form.

The material with a refractive index gradient according to the invention may be used, for example, for the production of passive light-guide elements for displays and illumination elements, for security holograms, picture holograms, digital holograms for information storage, for systems with components which process light wavefronts, for applications as planar waveguides, for applications influencing the polarization of light, for applications as beam splitters and as lenses.

In the examples below, the angle of view is measured as a gage of the refractive index modulation which is obtained. In this case, the luminescence of a nanocomposite material applied to a substrate is analyzed, after the particle migration and complete curing of the matrix (freezing-in of the refractive index gradient), in 1° steps up to 60° ( ) by a luminescence meter (60° with respect to the central axis). The angle of view corresponds to the full width at half maximum ½ of a plot of intensity I [%] against the angle (−30 to +30° C.). A higher angle of view implies a greater scattering power of the material. Values above 10° are desirable.

EXAMPLE 1

Production of a Photo-nanocomposite for Holography a) Production of $Zr(OPr)_4/MAA$ (1:1):

65.4 g (0.20 mol) of $Zr(OPr)_4$ are placed in a 250 ml three-necked flask and cooled in an ice bath. 17.2 g (0.20 mol) of methacrylic acid (MM) are added dropwise thereto slowly (15 min) while stirring. Following complete addition, the reaction mixture is removed from the ice bath after 10 min and subsequently stirred at 25° C.

b) Production of a Silane-PVB Mixture:

24 g (0.20 mol) of dimethyldimethoxysilane (DMDS) are added to 49.6 g (0.20 mol) of methacryloxypropyltrimethoxysilane (MPTS) and stirred for 5 min at 25° C. Following the addition of 9.05 g of 0.1 N HCl, stirring is continued for a further 10 min at 25° C., until the reaction mixture clarifies. 49.92 g of polyvinyl butyral (30% strength by weight in 2-PrOH) are subsequently added thereto and stirred for 5 min at 25° C.

c) Production of the Matrix 22.27 g of the $Zr(OPr)_4/MAA$ nanoparticle produced in a) is added slowly to the mixture b) while stirring. Following complete addition, it is left to stand for 4 hours at 25° C. and 1.08 g (0.06 mol) of water is added dropwise. After stirring overnight at 25° C., 6.2 g of dodecanediol dimethacrylate (DDDMA) and 1.6 g of the photostarter ®Irgacure 184 are added.

EXAMPLES 2 TO 4 the Preparation of $Zr(OPr)_4/MAA$ in the Ratio 1:1 is Carried Out as in Example 1

MPTS is placed in a second vessel, and the required amounts of DMDES, PVB solution (30% strength by weight in ethanol) and TEG di(2-ethylhexanoate) according to Table 1 are added thereto and stirred for 15 min at 25° C. 0.1 N HCl is then added and stirred for about 10 min at RT, until the originally turbid reaction mixture clarifies. $Zr(OPr)_4/MAA$ is then slowly added with the aid of a dropping funnel while stirring. Following complete addition, it is stirred for 4 h at RT. The required amount of water is subsequently added dropwise and stirred overnight at RT.

®Crodamer UVA 421 is then added. ®Irgacure 819 is added after a further 15 min. The batch is subsequently diluted with isopropanol and ®Byk 306 is added. It is stirred until fully homogenized.

TABLE 1

|  | Example 2 | | Example 3 | | Example 4 | |
| --- | --- | --- | --- | --- | --- | --- |
| MPTS | 18.6 g | 0.075 mol | 24.8 g | 0.1 mol | 31.0 g | 0.125 mol |
| PVB solution | 133.6 g | | 133.6 g | | 133.6 g | |
| TEG di(2-ethylhexanoate) | 105.1 g | | 110.6 g | | 116.1 g | |
| DMDES | 11.1 g | 0.075 mol | 14.8 g | 0.1 mol | 18.5 g | 0.125 mol |
| 0.1 N HCl | 3.375 g | 0.1875 mol | 4.50 g | 0.25 mol | 5.6 g | 0.3125 mol |
| $Zr(O^nPr)_4/(MAA)$ | 41.6 g | | 41.6 g | | 41.6 g | |
| $H_2O$ | 1.9 g | 0.11 mol | 1.9 g | 0.11 mol | 1.9 g | 0.11 mol |
| Crodamer UVA 421 | 6.41 g | | 6.75 g | | 7.08 g | |
| Irgacure 819 | 6.41 g | | 6.75 g | | 7.08 g | |
| Byk 306 | 6.15 g | | 6.5 g | | 6.8 g | |
| Isopropanol | 82.0 g | | 86.3 g | | 90.6 g | |
| angle of view | 12° | | 12° | | 13° | |

TEG = triethylene glycol
DMDES = dimethyldiethoxysilane

EXAMPLES 5 TO 14

The Production of Zr(OPr)$_4$/MAA is Carried Out as Described in Example 1

MPTS is placed in a second vessel, the required amounts of DMDES, PVB solution (30% strength by weight in ethanol) and isopropanol are added and stirred for 15 min at 25° C. The 0.1 N HCl is then added and stirred for about 10 min at RT, until the originally turbid reaction mixture clarifies. The required amount of Zr(OPr)$_4$/MAA is then slowly added with the aid of a dropping funnel while stirring. Following complete addition, it is stirred for 4 h at RT. The required amount of water is subsequently added dropwise and stirred overnight at RT.

Irgacure 819 and Byk 306 are then added. It is stirred until fully homogenized (basic coating). The softeners and sensitizers according to Table 2 are subsequently added.

Basic Coating

| | | |
|---|---|---|
| MPTS | 139 g | 0.56 mol |
| PVB solution | 601.2 g | |
| Isopropanol | 365.7 g | |
| DMDES | 82.9 g | 0.56 mol |
| 0.1 N HCl | 25.2 g | 1.41 mol |
| Zr(O$^n$Pr)$_4$/(MAA) | 187.2 g | |
| H$_2$O | 8.46 g | 0.47 mol |
| Irgacure 819 | 15.8 g | |
| Byk 306 | 23.7 g | |

PVB: ® Mowital 30 HH and 60 HH (1:1)

TABLE 2

Variation of the softeners and sensitizers (variation per 10 g batch):

| Ex. | Crodamer UVA 421 | Polyalkylene glycol acrylate | TEG di(2-ethylhexanoate) | angle of view |
|---|---|---|---|---|
| 5 | 0.7776 g | — | 3.1104 g | 16° |
| 6 | 1.1664 g | — | 3.1104 g | 16° |
| 7 | 1.5552 g | — | 1.5552 g | 12° |
| 8 | 0.7776 g | 2.3328 g PPGDMA (570) | — | 12° |
| 9 | 0.7776 g | 1.5552 g PEGDMA (330) | — | 13° |
| 10 | 0.7776 g | 1.5552 g PEGDMA (330) | 0.7776 g | 13° |
| 11 | 0.7776 g | 2.3328 g PPGDA (540) | — | 10° |
| 12 | 0.7776 g | 1.5552 g PEGDA (258) | 0.7776 g | 13° |
| 13 | — | 1.5552 g PEGDMA (330) | 1.5552 g | 14° |
| 14 | — | 0.7776 g PEGDMA (330) | 2.3328 g | 16° |

PPGDMA (570): Polypropylene glycol dimethacrylate (average molar mass: 570 g/mol)
PEGDMA (330): Polyethylene glycol dimethacrylate (average molar mass: 330 g/mol)
PPGDA (540): Polypropylene glycol diacrylate (average molar mass: 540 g/mol)
PEGDA (258): Polyethylene glycol diacrylate (average molar mass: 258 g/mol)

EXAMPLE 15

Production of a Photo-nanocomposite for Lithography 592.2 g (1.81 mol) of Zr(OPr)$_4$ are placed in a 2 l three-necked flask and cooled to 10° C. in an ice bath. 155.7 g (1.81 mol) of MAA are slowly added dropwise thereto while stirring. Following complete addition, the reaction mixture is removed from the ice bath after 10 min and subsequently stirred at 25° C.

2312.1 g of PVB (30% strength by weight in 2-propanol) are placed in a 10 l reactor. First 2241.9 g (9.04 mol) of MPTS and then 1338 g (9.04 mol) of dimethyldiethoxysilane (DMDES) are added slowly thereto and homogenized for 45 min at 25° C. 407 g of 0.1 N HCl is subsequently added. The temperature of the reactor is kept constant at 40° C. by means of a thermostat. Following clarification of the reaction mixture, 748 g of the Zr(OPr)$_4$/MAA produced above is added dropwise while stirring vigorously at 40° C. Following complete addition, the reaction mixture is stirred for 4 hours at 25° C. 48.78 g (2.71 mol) of water are then added and stirred for a further 16 h at 25° C. 260 g of hexanediol dimethacrylate (HDDMA) are subsequently added, followed by stirring for 30 min at 25° C., and finally 99 g of ®Crodamer UVA 421. After a further 30 min of stirring at 25° C., 99.5 g of Irgacure 819 are added.

Holographic Experiments

Phase-modulated volume holograms, as well as transmission and reflection holograms, are produced by means of two-wave mixing. An argon ion laser is used here as the coherent light source. The laser beam (20 mW/cm$^2$) is focused onto a diameter of approximately 0.5 mm and split by a beam splitter into two subsidiary beams of equal intensity. The interference of these two beams leads to a spatially periodic change in the light intensity. The material from Example 1 is used as the holographic material. For the layer production, the photo-nanocomposite material is laminated onto a glass substrate (10 cm×10 cm×0.25 cm), covered with a polyester film and illuminated with these intensity modulations. A grating structure is formed, which has the same periodicity as the intensity modulations. The refractive index profile is frozen in by blocking one of the write beams used in the experiment, in order to use the remaining beam for subsequent polymerization. In this way, volume holograms with a diffraction efficiency of 90% (wavelength: 633 nm) are produced.

Lithographic Experiment

The nanocomposite material produced in Example 15 is laminated onto polyester (preferably PET) by a slot-coating process and cured at 65° C. in an oven for 5 min. In order to protect the coating, it is laminated with a peel-off film. The films produced in this way are 200 m long and 36 cm wide, and the dry film thickness is from 20 to 80 μm, preferably from 40 to 60 μm.

In order to produce a diffuser, the protective film is removed and the photosensitive side is applied to a lithographic mask. In a continuous process (speed of the web: 315 mm/min), the layer photo-nanocomposite is illuminated with UV light (high pressure Hg lamp, power: 1200 W) through masks with an optical density of from 0.8 to 1.8, preferably from 1.0 to 1.3. The reflective index gradient is fixed by heat treatment in an oven at 100° C. for 5 min.

The invention claimed is:

1. A polymerizable nanocomposite material in solid or gel form, containing
   a) from 4.9 to 95.9% by weight of a soluble polymer;
   b) from 4 to 95% by weight of a partially or fully condensed silane selected from acrylosilanes, epoxysilanes, acryloalkoxysilanes, acryloepoxysilanes, epoxyalkoxysilanes, alkoxysilanes and alkylalkoxysilanes, the silane having an inorganic condensation ratio of from 33 to 100% and an organic conversion ratio of from 0 to 95%;

c) from 0 to 60% by weight of an acrylate;

d) from 0.1 to 50% by weight of surface-modified nanoscale particles selected from oxides, sulfides, selenides, tellurides, halides, carbides, arsenides, antimonides, nitrides, phosphides, carbonates, carboxylates, phosphates, sulfates, silicates, titanates, zirconates, aluminates, stannates, plumbates and mixed oxides thereof;

e) from 0 to 50% by weight of a softener;

f) from 0 to 5% by weight of an additive selected from thermal or photochemical crosslinking initiator, sensitizer, wetting agent, adhesion promoter, rheological additive, antioxidant, stabilizer, colorant, photochromic and thermochromic substance, and a combination thereof; further where weight, in each case is expressed in terms of the total weight of solids in the nanocomposite material, wherein the polymerizable nanocomposite material is in solid or gel form.

2. The nanocomposite material as claimed in claim 1, characterized in that the soluble polymer a) is selected from polyacrylate, polymethacrylate, polyepoxide, polyvinyl alcohol, polyvinyl acetate and polyvinyl butyral, further where the polymer is soluble in an organic solvent.

3. The nanocomposite material as claimed in claim 1, characterized in that the silane b) is selected from methacryloxypropyltrimethoxysilane, acryloxypropyltrimethoxysilane, dimethyldimethoxysilane, dimethyldiethoxysilane, 3-glycidyloxy-propyltrimethoxysilane, vinyltriethoxysilane, methyltriethoxysilane and a combination thereof.

4. The nanocomposite material as claimed in claim 1, characterized in that the acrylate c) is selected from methyl methacrylate, diol diacrylate and diol dimethacrylate.

5. The nanocomposite material as claimed in claim 1, characterized in that the nanoscale particles d) are surface-modified with compounds selected from compounds containing (meth)acryl, allyl, vinyl, epoxy, hydroxyl, carboxyl, amino groups and a combination thereof.

6. The nanocomposite material as claimed in claim 1, characterized in that the nanoscale particles are selected from surface-modified $SiO_2$, $TiO_2$, $ZrO_2$, and $Ta_2O_5$ particles.

7. The nanocomposite material as claimed claim 1, containing from 0.1 to 30% by weight of a softener.

8. A process for the production of a nanocomposite material as claimed in claim 1, characterized in that the silane b) is partially or fully condensed by adding a hydrolyzer and optionally polymerized by UV irradiation, and mixed with one or more of the components a), c) to f), or the silane b) is first mixed with one or more of the components a), c) to f) and then condensed and optionally polymerized, and optionally organic solvent is subsequently removed.

9. A film with a refractive index gradient, comprising one or two transparent plastic films which are coated with a nanocomposite material as claimed in claim 1, further where a refractive index gradient has been produced by applying an electrical potential difference, electron irradiation, holography, lithography or by local illumination.

10. A process for the production of a film with a refractive index gradient characterized in that a polymerizable nanocomposite material in solid or gel form, containing:

a) from 4.9 to 95.9% by weight of a soluble polymer;

b) from 4 to 95% by weight of a partially or fully condensed silane selected from acrylosilanes, epoxysilanes, acryloalkoxysilanes, acryloepoxysilanes, epoxyalkoxysilanes, alkoxysilanes and alkylalkoxysilanes, the silane having an inorganic condensation ratio of from 33 to 100% and an organic conversion ratio of from 0 to 95%;

c) from 0 to 60% by weight of an acrylate;

d) from 0.1 to 50% by weight of surface-modified nanoscale particles selected from oxides, sulfides, selenides, tellurides, halides, carbides, arsenides, antimonides, nitrides, phosphides, carbonates, carboxylates, phosphates, sulfates, silicates, titanates, zirconates, aluminates, stannates, plumbates and mixed oxides thereof;

e) from 0 to 50% by weight of a softener;

f) from 0 to 5% by weight of an additive selected from thermal or photochemical crosslinking initiator, sensitizer, wetting agent, adhesion promoter, rheological additive, antioxidant, stabilizer, colorant, photochromic and thermochromic substance, and a combination thereof; further where weight, in each case is expressed in terms of the total weight of solids in the nanocomposite material is applied to a transparent plastic film, an organic solvent is allowed to evaporate, optionally the nanocomposite layer is laminated with a transparent cover film, a refractive index gradient is produced in the nanocomposite layer by applying an electrical potential difference, electron irradiation, holography, lithography or by local illumination, and the refractive index gradient is subsequently fixed by complete thermal and/or light-induced crosslinking of the nanocomposite material to provide a film with a refractive index gradient.

* * * * *